US011992874B2

(12) United States Patent
Wang et al.

(10) Patent No.: US 11,992,874 B2
(45) Date of Patent: May 28, 2024

(54) PROCESS TO MAKE A CERAMIC FILTER FOR METAL CASTING

(71) Applicant: GM Global Technology Operations LLC, Detroit, MI (US)

(72) Inventors: Qigui Wang, Rochester Hills, MI (US); Andrew Thomas Cunningham, Royal Oak, MI (US); Zach Steffes, West Bloomfield, MI (US); Jeffrey B. Harris, Detroit, MI (US); Brennon L. White, Novi, MI (US); Liang Wang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 355 days.

(21) Appl. No.: 17/307,295

(22) Filed: May 4, 2021

(65) Prior Publication Data

US 2022/0355369 A1 Nov. 10, 2022

(51) Int. Cl.
*B22C 9/08* (2006.01)
*B01D 39/20* (2006.01)
*B28B 1/00* (2006.01)
*B33Y 10/00* (2015.01)
*B33Y 80/00* (2015.01)

(52) U.S. Cl.
CPC .......... *B22C 9/086* (2013.01); *B01D 39/2075* (2013.01); *B01D 39/2093* (2013.01); *B28B 1/001* (2013.01); *B01D 2239/12* (2013.01); *B33Y 10/00* (2014.12); *B33Y 80/00* (2014.12)

(58) Field of Classification Search
CPC ................ B22C 9/086; B01D 39/2075; B01D 39/2093; B01D 2239/12; B01D 2239/065; B01D 2239/086; B01D 2239/10; B28B 1/001; C22B 9/023; C22B 21/066; B22D 43/004
See application file for complete search history.

(56) References Cited

U.S. PATENT DOCUMENTS

| 4,448,833 | A | 5/1984 | Yamaguchi et al. |
| 5,104,540 | A | 4/1992 | Day et al. |
| 7,052,532 | B1 * | 5/2006 | Liu .................... B01D 46/0001 55/DIG. 5 |

(Continued)

FOREIGN PATENT DOCUMENTS

| CN | 113950464 A | 1/2022 |
| DE | 3040754 A1 | 5/1981 |

(Continued)

*Primary Examiner* — Seyed Masoud Malekzadeh
*Assistant Examiner* — Vipul Malik
(74) *Attorney, Agent, or Firm* — Vivacqua Crane, PLLC

(57) ABSTRACT

A method to manufacture a ceramic foam filter includes: sintering a filter body to a temperature greater than a molten metal to be filtered through the body; creating multiple tortuous path channels extending through the filter body individually having a repeated and controlled passage geometry creating a continuously changing diameter and area of a flow path through the multiple tortuous path channels causing localized increases and decreases in molten metal flow rate through the multiple tortuous path channels; and applying a mixture of at least one ceramic powder and at least one binder using additive manufacturing to shape the filter body including the multiple tortuous path channels.

20 Claims, 7 Drawing Sheets

(56) References Cited

U.S. PATENT DOCUMENTS

| | | | |
|---|---|---|---|
| 10,780,493 B1* | 9/2020 | Sokol | B01D 39/086 |
| 2007/0246185 A1 | 10/2007 | Stahl et al. | |
| 2010/0230359 A1 | 9/2010 | Whitehead et al. | |
| 2011/0240245 A1 | 10/2011 | Schlienger et al. | |
| 2012/0144958 A1 | 6/2012 | Olson, III et al. | |
| 2016/0282294 A1* | 9/2016 | Ivnitski | C22C 1/08 |
| 2018/0078888 A1* | 3/2018 | Gage | B28B 1/30 |
| 2018/0142108 A1* | 5/2018 | Lewis | B29C 64/209 |
| 2020/0276528 A1* | 9/2020 | Gibson | B01D 39/2075 |

FOREIGN PATENT DOCUMENTS

| | | | | |
|---|---|---|---|---|
| EP | 358361 B1 | 6/1994 | | |
| WO | WO-03013688 A1 * | 2/2003 | | B22C 9/086 |
| WO | 2016187097 A1 | 11/2016 | | |
| WO | 2018138210 A1 | 8/2018 | | |

* cited by examiner

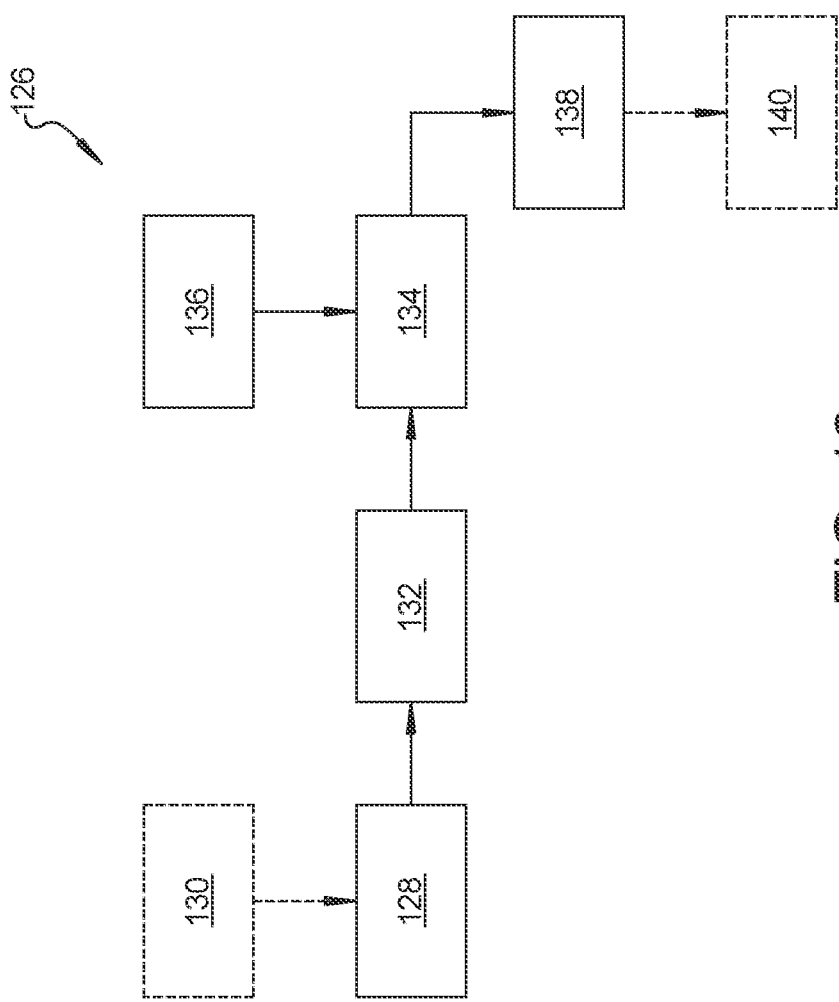

PROCESS TO MAKE A CERAMIC FILTER FOR METAL CASTING

INTRODUCTION

The present disclosure relates to ceramic filters used in metal casting operations to remove inclusions and oxides in the liquid metal during metal pour.

Components such as cylinder heads and engine blocks for automobile vehicle engines are commonly cast using a semi-permanent mold which is filled with molten metal such as aluminum which is gravity fed into the mold. A semi-permanent mold (SPM) involves a casting process, which may produce aluminum alloy castings from re-usable metal molds and sand cores to form internal passages within the resulting casting. Liquid metal casting operations are used for example to pour liquid aluminum into a mold to produce automobile vehicle engine blocks and other engine components such as the cylinder heads.

In known casting methods a ceramic filter is positioned in the liquid metal pour path upstream of the mold which filters out inclusions and oxides from the liquid metal, thereby improving casting purity. Known ceramic filters for liquid aluminum material pours are made of a ceramic foam which is suitable for the aluminum melt temperature. In the conventional method of ceramic foam filter production, polyurethane sponges or expanded polystyrene with a size similar to the ceramic filters are first dipped into a ceramic slurry. After dipping, the ceramic slurry fills the voids in the polymer sponges. The polymer sponges filled with the ceramic slurry are then baked/sintered in an oven. After the polymer sponges are sintered, the remaining material is the ceramic foam filter. Such materials however are susceptible to non-uniform and inconsistent pore sizes and therefore may result in low filtration efficiency. The non-uniform and inconsistent pore sizes produce significant variation in metal flow rate through the filter and therefore through the system, which negatively impacts mold fill and cure times. Reticulated ceramic foam filters also produce significant variation in metal flow rate because of pore size variation.

Thus, while current ceramic filters used in liquid metal pour operations achieve their intended purpose, there is a need for a new and improved system and method for filtering inclusions and oxides from liquid metal during mold pour operation.

SUMMARY

According to several aspects, a method to manufacture a ceramic foam filter includes: sintering a filter body to a temperature greater than a molten metal to be filtered through the body; creating multiple tortuous path channels extending through the filter body individually having a repeated and controlled passage geometry creating a continuously changing diameter and area of a flow path through the multiple tortuous path channels causing localized increases and decreases in molten metal flow rate through the multiple tortuous path channels; and applying a mixture of at least one ceramic powder and at least one binder using additive manufacturing to shape the filter body including the multiple tortuous path channels.

In another aspect of the present disclosure, the method further includes individually shaping the multiple tortuous path channels as a sinusoidal-shape.

In another aspect of the present disclosure, the method further includes configuring the multiple tortuous path channels having a first diameter at a largest section of an oval-shaped pocket which is larger than a second diameter at a reduced diameter neck region.

In another aspect of the present disclosure, the method further includes configuring the filter body having multiple layers, with individual ones of the multiple layers having different sizes of the multiple tortuous path channels.

In another aspect of the present disclosure, the method further includes removing individual ones of the multiple layers to change a total flow rate through the filter body.

In another aspect of the present disclosure, the method further includes providing a different wettability for individual ones of the multiple layers.

In another aspect of the present disclosure, the method further includes creating recurring rectangular-shaped pockets including a reducing area neck region for individual ones of the multiple tortuous path channels.

In another aspect of the present disclosure, the method further includes: creating a flow passage for individual ones of the multiple tortuous path channels by adding an impact wall between opposed first and second path channel walls oriented at an angle to a flow direction of the molten metal within the flow passage; and forming an inner wall of a low point cavity in the second path channel wall acting to trap objects entrained within the molten metal.

In another aspect of the present disclosure, the method further includes: positioning a V-shaped impact wall within a flow passage defining between opposed first and second path channel walls oriented at an angle to a flow direction of the molten metal within the flow passage; and creating an inverted V-shaped upstream wall of the V-shaped impact wall.

In another aspect of the present disclosure, the method further includes conducting the sintering to a temperature greater than a temperature of a molten aluminum defining the molten metal.

According to several aspects, a method to manufacture a ceramic foam filter includes: applying a mixture of at least one ceramic powder and at least one binder using additive manufacturing to shape a filter body; extending multiple tortuous path channels through the filter body including at least a first cross section having a first area and a second cross section having a second area less than the first area; varying an equivalent circle diameter of the multiple tortuous path channels between 0.1 mm and 5.0 mm; and sintering the filter body to a temperature greater than a molten metal to be filtered through the body.

In another aspect of the present disclosure, the method further includes forming the filter body using multiple layers.

In another aspect of the present disclosure, the method further includes selecting a different flow of the molten metal through the multiple tortuous path channels by varying the multiple tortuous path channels in different ones of the multiple layers.

In another aspect of the present disclosure, the method further includes creating a continuously changing diameter and area of a flow path through the multiple tortuous path channels.

In another aspect of the present disclosure, the method further includes shaping the multiple tortuous path channels as spiral-shaped channels.

In another aspect of the present disclosure, the method further includes creating the filter body using multiple layers with the multiple tortuous path channels of individual ones of the multiple layers having different flow passage sizes.

In another aspect of the present disclosure, the method further includes: creating a flow passage for individual ones of the multiple tortuous path channels having an impact wall positioned between opposed first and second path channel walls oriented at an angle to a flow direction of the molten metal within the flow passage; and forming an inner wall of a low point cavity in the second path channel wall to trap objects entrained within the molten metal.

According to several aspects, a method for making a ceramic foam filter includes: selecting a ceramic foam filter body having a cell geometry of the filter body including one of a plurality of multiple tortuous path channels extending through the filter body wherein the multiple tortuous path channels have a repeated and controlled passage geometry; combining ceramic powders and at least one binder in a combining operation; printing the filter body using the ceramic powders and the binder using an additive manufacturing operation; and sintering the filter body at a sintering temperature above an anticipated temperature of a molten metal to be filtered by the filter body.

In another aspect of the present disclosure, the method further includes selecting a continuously changing diameter and area of a flow path through individual ones of the multiple tortuous path channels.

In another aspect of the present disclosure, the method further includes selecting an equivalent circle diameter of a cross section of the multiple tortuous path channels between 0.1 mm and 5.0 mm.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 12 is a flow diagram of exemplary method steps for forming the ceramic foam filter of FIG. 1.

DETAILED DESCRIPTION

The following description is merely exemplary in nature and is not intended to limit the present disclosure, application, or uses.

Figure 1:
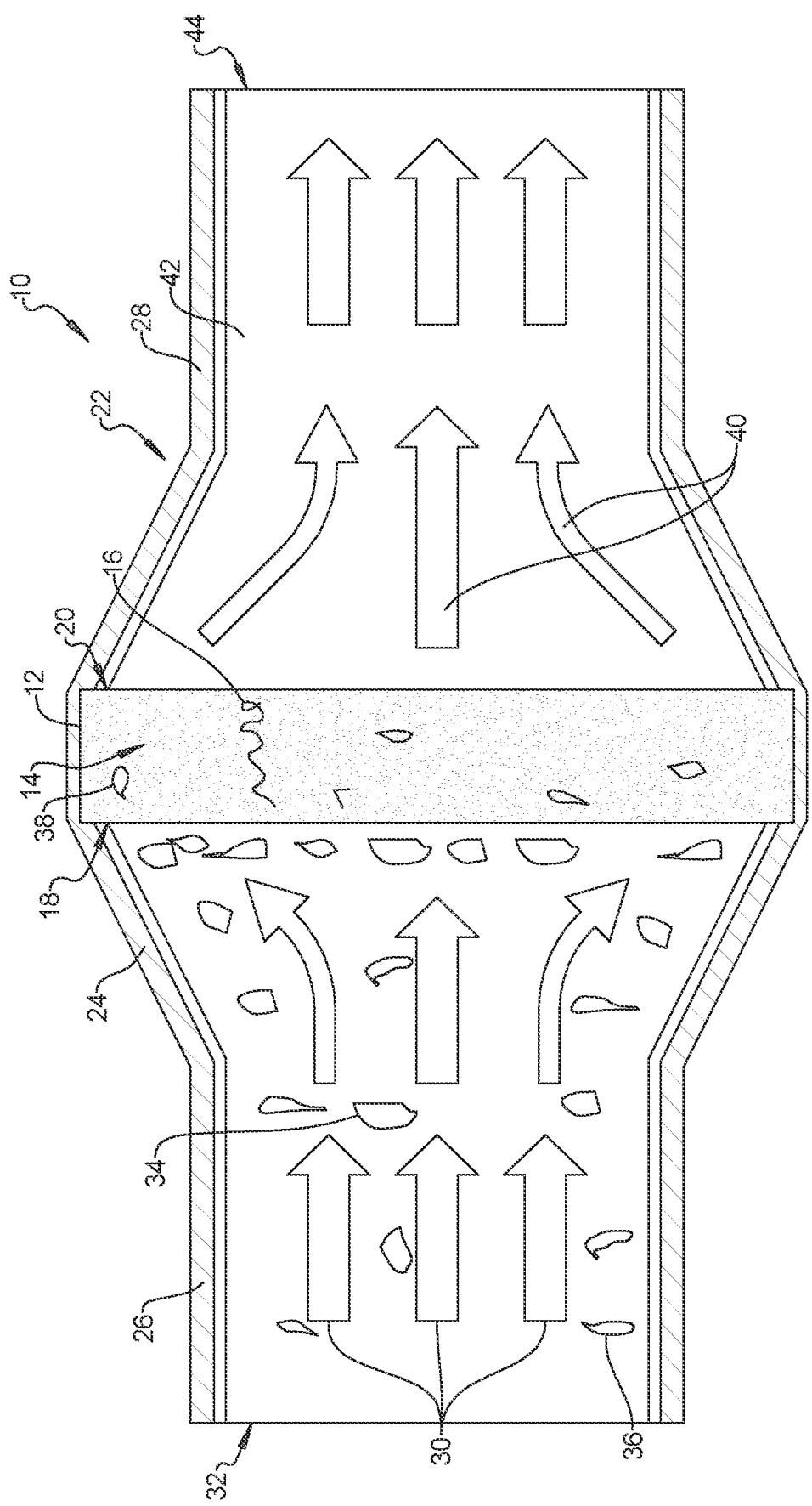
FIG. 1 is a front elevational cross-sectional view of a ceramic foam filter and canister according to an exemplary aspect; according to an exemplary aspect.

Referring to FIG. 1, a ceramic filter system 10 is presented which includes a ceramic foam filter 12 having a filter body 14 which provides multiple tortuous path channels 16 through the filter body 14 for filtering a molten metal such as aluminum. The molten metal enters the filter body 14 at an upstream end 18, traverses the filter body 14 via the multiple tortuous path channels 16 and discharges from the filter body 14 at a downstream end 20. The filter body 14 is positioned in a filter canister 22 having an enlarged portion 24 adapted to receive and retain the filter body 14. The filter canister 22 includes an inlet portion 26 upstream of the filter body 14 and an outlet portion 28 downstream of the filter body 14. Inlet flow of a molten metal 30 such as heated, liquid aluminum is received at an inlet end 32 of the filter canister 22. The molten metal 30 commonly contains inclusions 34 and oxides 36 of the molten metal 30 which are undesirable, and therefore intended to be removed using the filter body 14.

As the molten metal 30 encounters the filter body 14, a predominant portion of the inclusions 34 which are too large to enter the multiple tortuous path channels 16 are trapped against the upstream end 18 of the filter body 14. The multiple tortuous path channels 16 are also sized to trap a predominant portion of the oxides 36 which are shown as trapped oxides 38 within the filter body 14. A filtered molten metal 40 having the inclusions 34 and the oxides 36 removed is directed as a discharge flow 42 to exit the outlet portion 28 at an outlet end 44 of the filter canister 22.

Referring to FIG. 2 and again to FIG. 1, according to several aspects a first ceramic foam filter 12A includes multiple tortuous path channels 16A. A geometry of the multiple tortuous path channels 16A is shown and described in greater detail in reference to FIGS. 4 and 5.

Figures 2, 3:
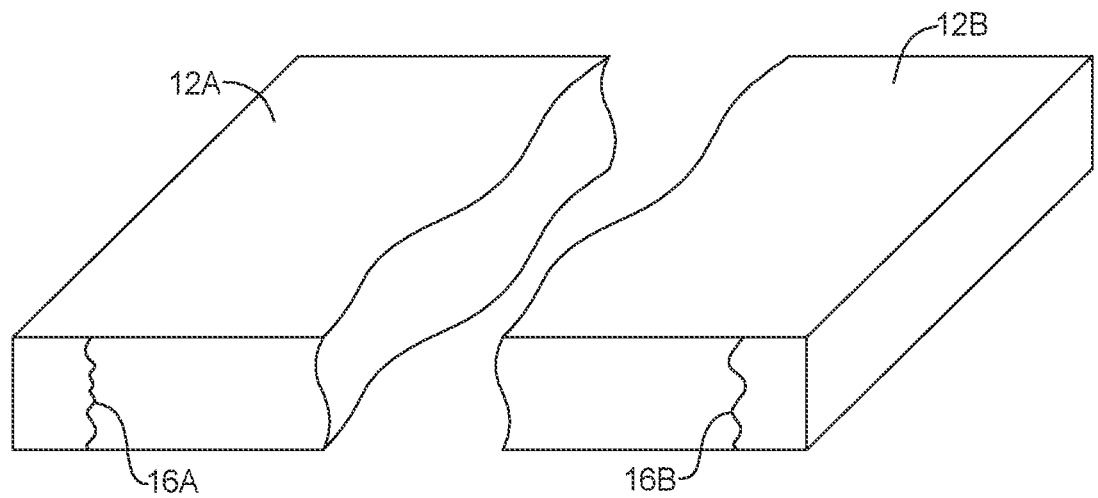
FIG. 2 is a front perspective view of a ceramic foam filter body according to a further aspect.
FIG. 3 is a front perspective view of a ceramic foam filter body according to a further aspect.

Referring to FIG. 3 and again to FIGS. 1 and 2, according to several aspects a second ceramic foam filter 12B includes multiple tortuous path channels 16B. A geometry of the multiple tortuous path channels 16B is shown and described in greater detail in reference to FIGS. 6 and 7.

Referring to FIG. 4 and again to FIG. 2, exemplary ones of the multiple tortuous path channels 16A of the first ceramic foam filter 12A are tubular with rectangular-shaped recurring pockets defining channels 16A1, 16A2, 16A3 arranged side-by-side. According to several aspects, matching upper, middle and lower columns of the multiple tortuous path channels 16B are commonly aligned with respect to each other, such as tortuous path channels 16A3A, 16A3B and tortuous path channel 16A3C. As previously noted as the molten metal such as molten aluminum passes through the multiple tortuous path channels 16A of the first ceramic foam filter 12A the inclusions and the oxides are trapped and removed and the flow becomes the filtered molten metal 40.

Figure 4:
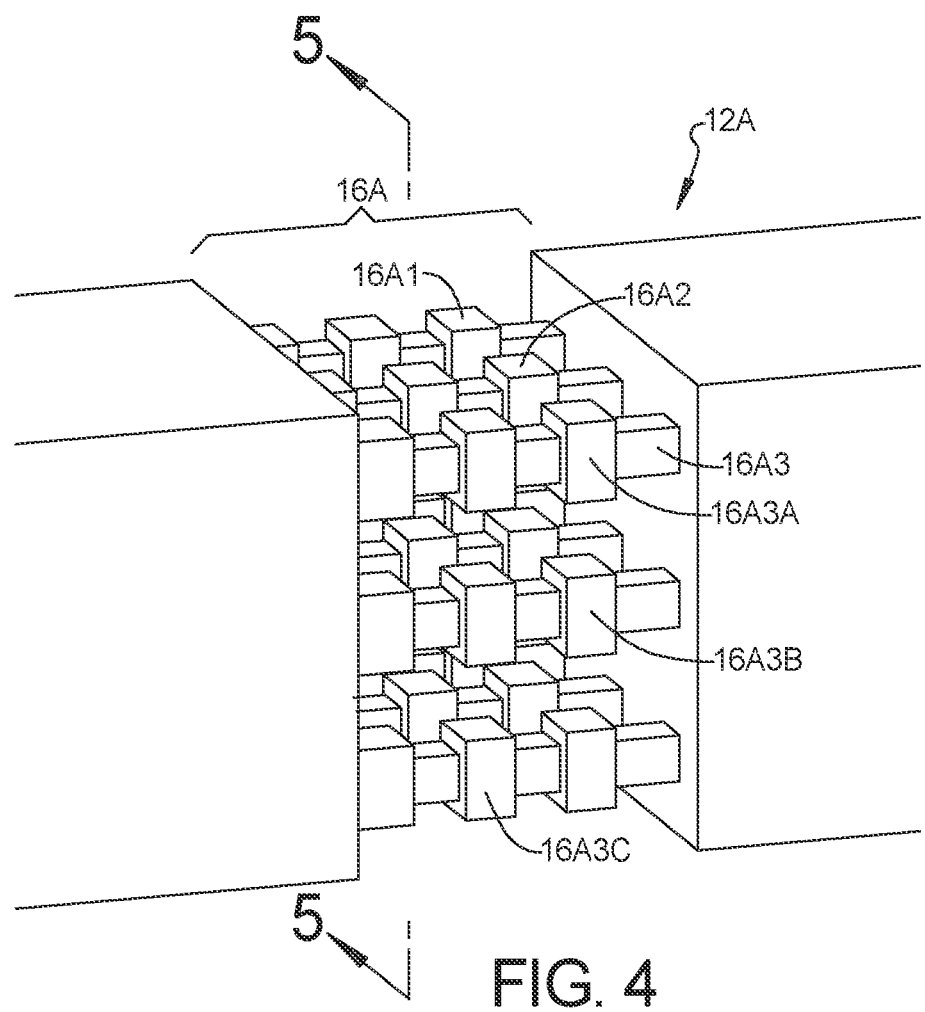
FIG. 4 is a side perspective partial cross-sectional view of the ceramic foam filter body of FIG. 2.
Figure 5:
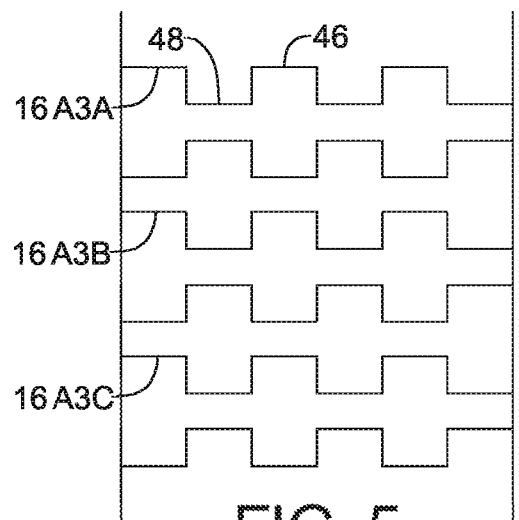
FIG. 5 is a cross-sectional side elevational view taken at section 5 of FIG. 4.

Referring to FIG. 5 and again to FIG. 4, individual ones of the multiple tortuous path channels 16A include recurring rectangular-shaped pockets 46 which are separated by reduced area neck regions 48. The reduced area neck regions 48 increase flow resistance of the molten metal and therefore create regions to trap oxides 38 as the trapped oxides 38 within the filter body 14. The reduced area neck regions 48 also trap any of the inclusions 34 that are small enough to pass into one of the multiple tortuous path channels 16A.

Referring to FIG. 6 and again to FIG. 4, exemplary ones of the multiple tortuous path channels 16B of the second ceramic foam filter 12B are tubular and sinusoidally-shaped such as tortuous path channels 16B1, 16B2, 16B3 arranged side-by-side. According to several aspects, matching upper and lower columns of the multiple tortuous path channels 16B are commonly aligned with respect to each other, such as tortuous path channel 16B3A and tortuous path channel 16B3B. As previously noted as the molten metal such as molten aluminum passes through the multiple tortuous path channels 16B of the filter body 14 of the second ceramic foam filter 12B the inclusions 34 and the oxides 36 are trapped and removed and the flow becomes the filtered molten metal 40.

Figure 6:
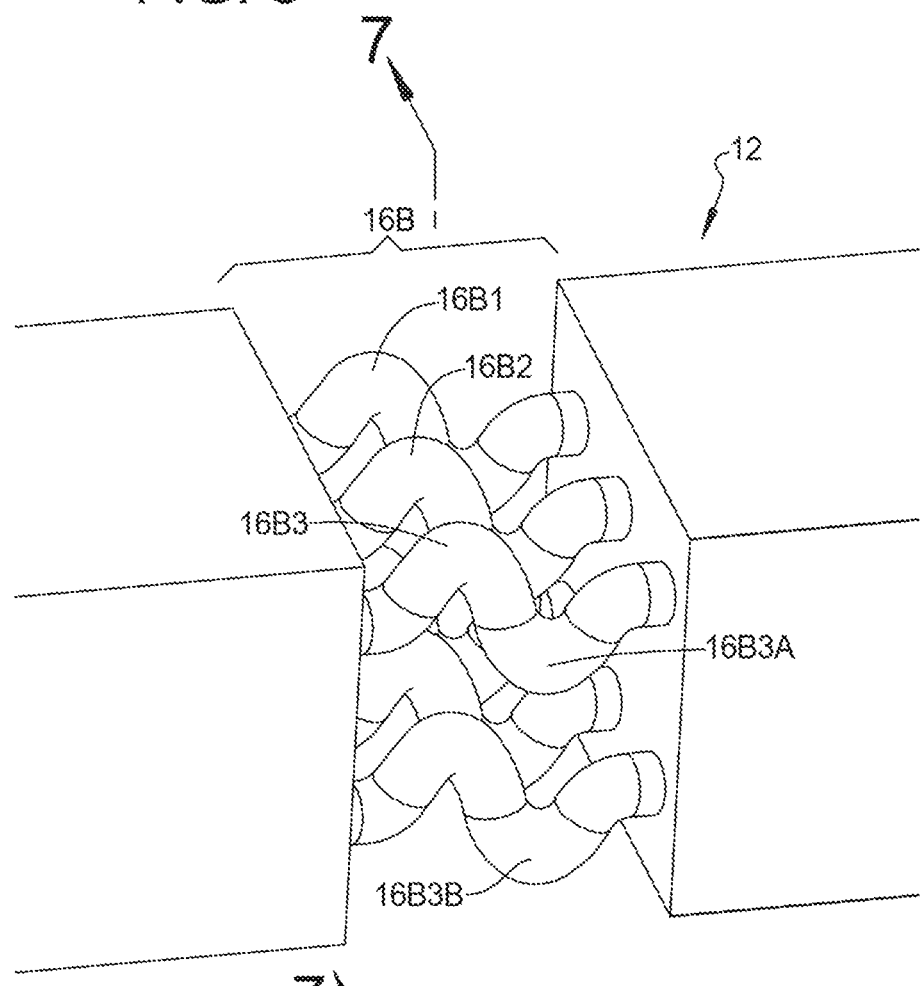
FIG. 6 is a side perspective partial cross-sectional view of the ceramic foam filter body of FIG. 3.

Referring to FIG. 7 and again to FIG. 6, individual ones of the multiple tortuous path channels 16B include recurring oval-shaped pockets 50 which are separated by reduced diameter neck regions 52. The reduced diameter neck regions 52 increase flow resistance of the molten metal and therefore create regions to trap the oxides 36 as the trapped oxides 38 within the filter body 14. The reduced diameter neck regions 52 also trap any of the inclusions 34 that are small enough to pass into one of the multiple tortuous path channels 16B.

Figure 7:
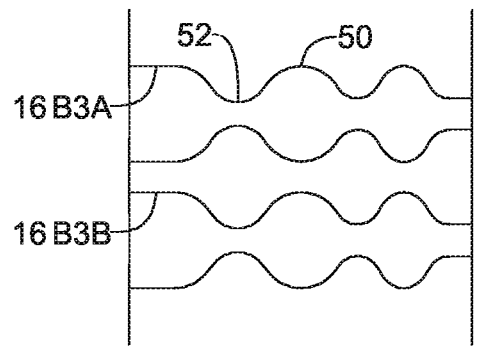
FIG. 7 is a cross-sectional side elevational view taken at section 7 of FIG. 6.
Figure 8:
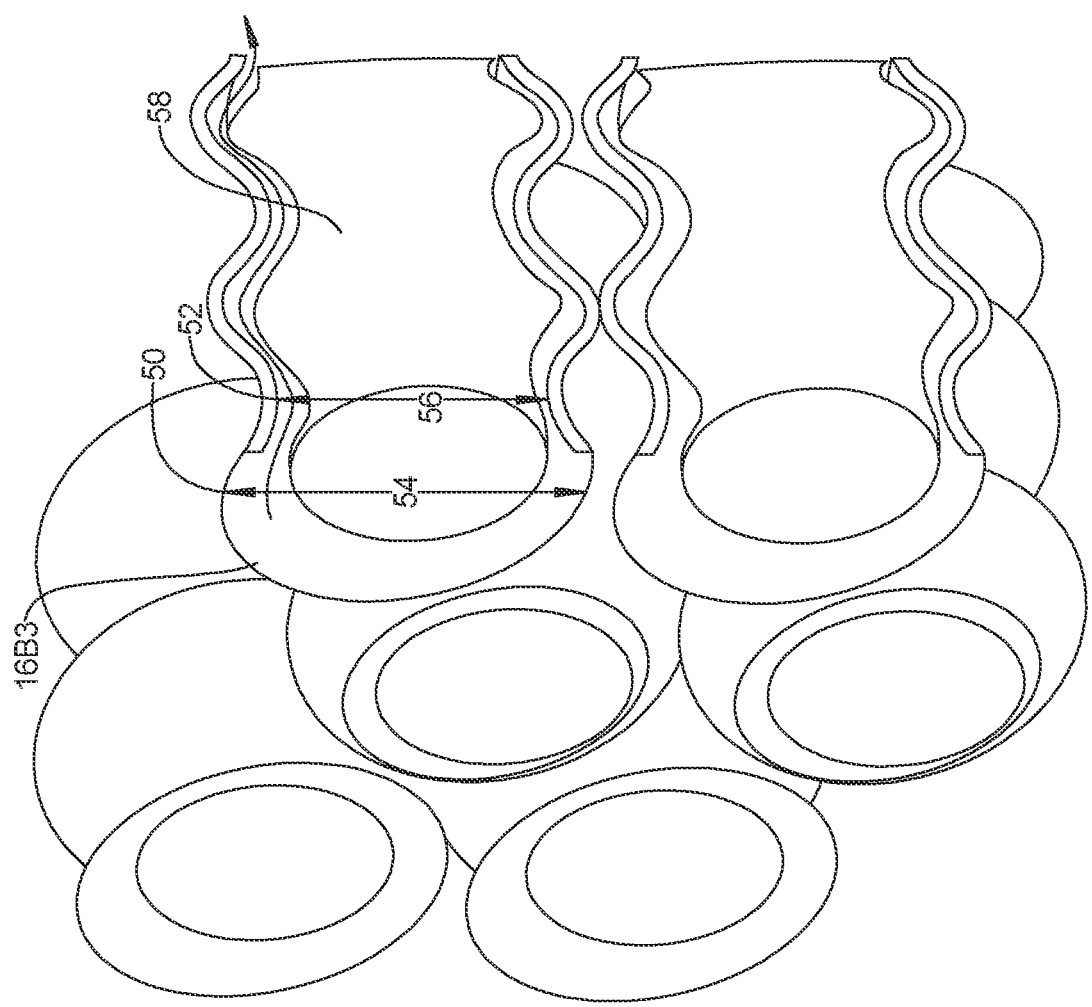
FIG. 8 is an isometric cross-sectional side elevational view similar to FIG. 7.

Referring to FIG. 8 and again to FIGS. 6 and 7, the exemplary tortuous path channel 16B3B includes a first diameter 54 defining a first area at a largest section of the oval-shaped pockets 50 which is larger than a second diameter 56 defining a second area at the reduced diameter neck regions 52. A continuously changing diameter and area of a flow path 58 through the tortuous path channel 16B3B causes localized increases and decreases in molten metal flow rate through the tortuous path channels, which enhances trapping of the inclusions 34 and the oxides 36 within slower velocity regions defined by the oval-shaped pockets 50.

Figure 9:
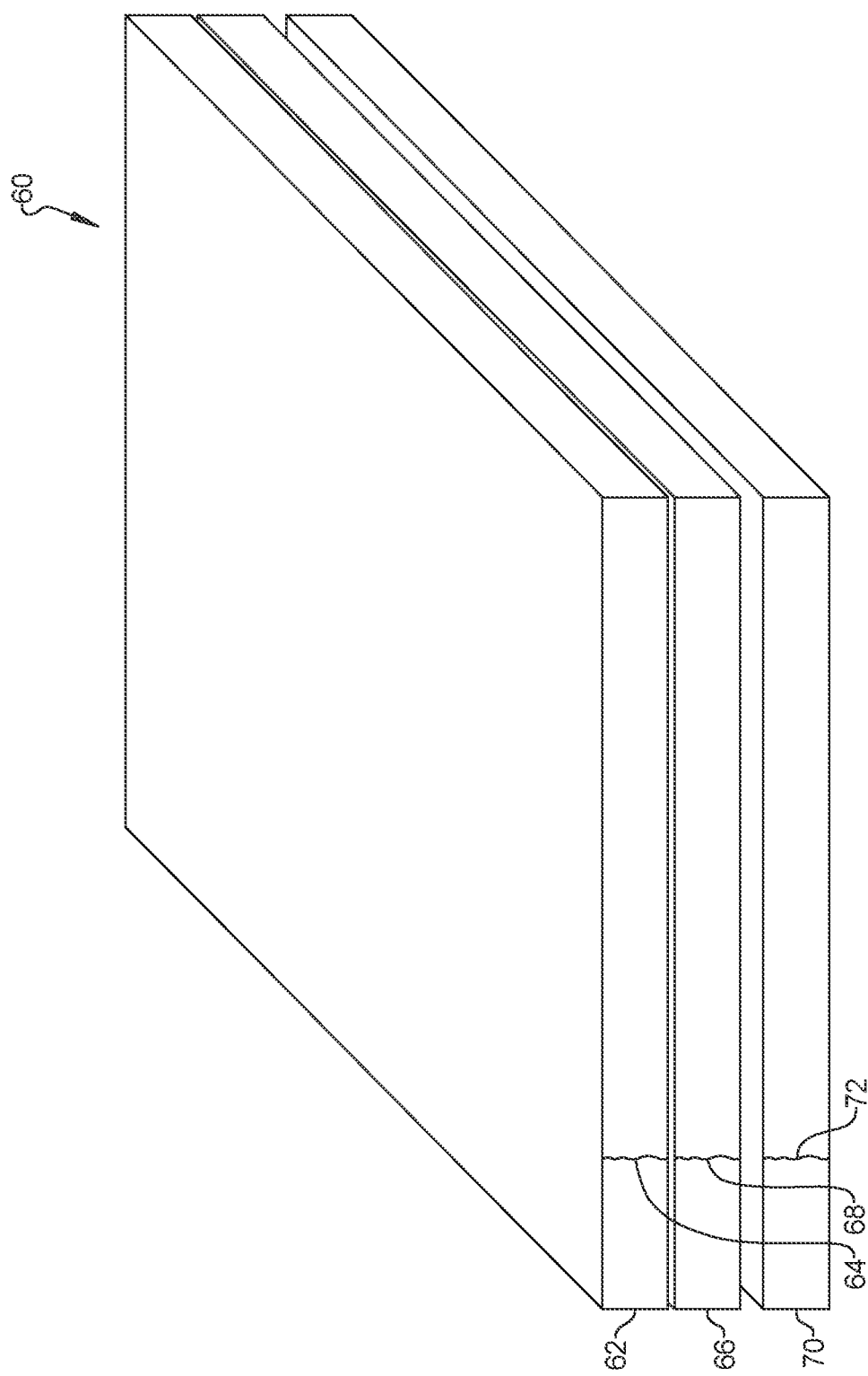
FIG. 9 is a front perspective view of a three-layer ceramic foam filter body according to a further aspect.

Referring to FIG. 9 and again to FIGS. 1 through 8, a filter body 60 is modified from the filter body 14 to include multiple layers of filter material having different pore sizes and geometry. A first filter layer 62 provides multiple first tortuous paths 64. A second filter layer 66 provides multiple second tortuous paths 68. A third filter layer 70 provides multiple third tortuous paths 72. The multiple first tortuous paths 64 are different from the multiple second tortuous paths 68, and the multiple third tortuous paths 72 are different than the multiple first tortuous paths 64 and the multiple second tortuous paths 68. Providing different tortuous path geometry in the individual layers of the filter body 60 allows the filter body 60 to be "pre-tuned" to filter out different size objects in the different individual layers. For example, a first range of sizes of the inclusions 34 may be selectively filtered using the first filter layer 62, a second range of sizes of the inclusions 34 may be selectively filtered using the second filter layer 66 and the oxides 36 may be selectively filtered using the third filter layer 70.

Figure 10:
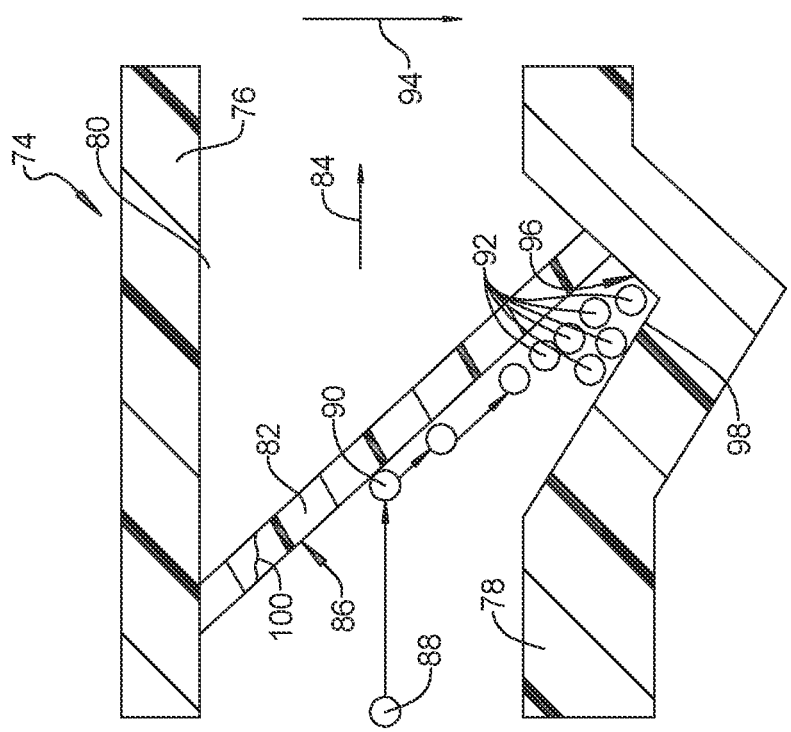
FIG. 10 is a cross-sectional side elevational view similar to FIG. 5 of an impact wall positioned in a flow path.

Referring to FIG. 10 and again to FIGS. 1 through 9, a filter body 74 is modified from the filter body 14 and includes opposed tortuous path first and second channel walls 76 and 78. A flow passage 80 includes an impact wall 82 positioned between the opposed tortuous path first and second path channel walls 76 and 78 and oriented at an angle to a flow direction 84 of molten metal within the flow passage 80. An upstream wall 86 is impacted by components of the molten metal such as an inclusion 88. An inclusion 90 impacting the upstream wall 86 travels down the upstream wall 86 due to a gravity force 94 and is trapped with multiple other inclusions 92 against an inner wall 96 of a low point cavity 98 formed in the second channel path wall 78. Multiple tortuous path channels 100 are provided in the impact wall 82 to permit flow of molten metal through the impact wall 82 in the flow direction 84.

Figure 11:
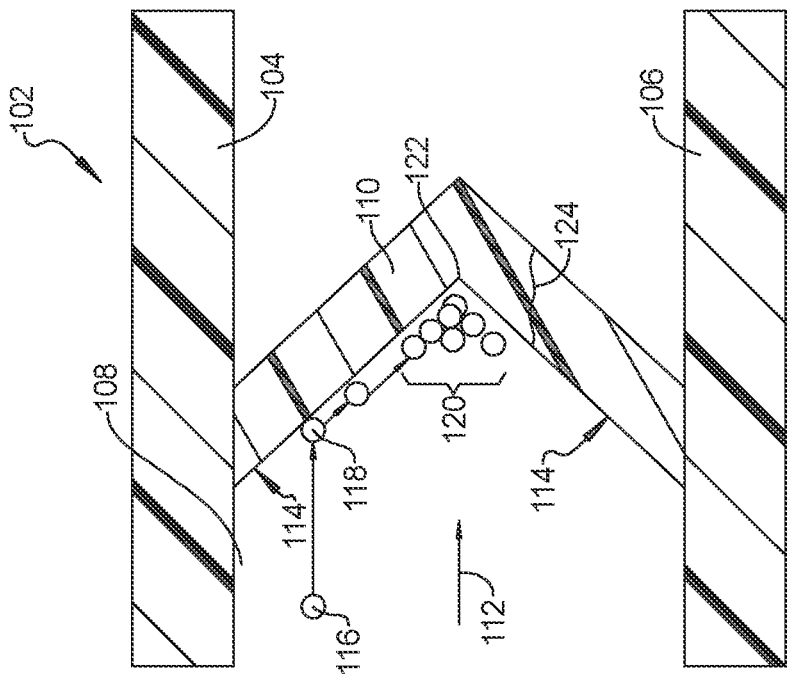
FIG. 11 is a cross-sectional side elevational view similar to FIG. 10 of a V-shaped impact wall positioned in a flow path.

Referring to FIG. 11 and again to FIGS. 1 through 10, a filter body 102 is modified from the filter body 14 and the filter body 74 and includes opposed first and second tortuous path channel walls 104 and 106. A flow passage 108 includes a V-shaped impact wall 110 positioned between the opposed first and second tortuous path channel walls 104 and 106 and is oriented at an angle to a flow direction 112 of molten metal within the flow passage 108. An inverted V-shaped upstream wall 114 is impacted by components of the molten metal such as an inclusion 116. An inclusion 118 impacting the inverted V-shaped upstream wall 114 travels along the inverted V-shaped upstream wall 114 due to the force of fluid flow and is trapped with multiple other inclusions 120 against the inverted V-shaped upstream wall 114 at an interior cavity 122 formed at an included junction of the inverted V-shaped upstream wall 114. Multiple tortuous path channels 124 are provided in the V-shaped impact wall 110 to permit flow of molten metal through the V-shaped impact wall 110 in the flow direction 112.

Referring to FIG. 12 and again to FIGS. 1 through 10, a method to design and optimize a porous channel geometry and sizes of a foam ceramic filter 126 includes in an initial optimizing phase 128 using computational fluid dynamics based on filtration efficiency and casting quality grade requirements to optimize a ceramic filter design. In an extraction phase 130 information to use in the optimizing phase 128 is extracted from a file of filter efficiency and casting quality requirements. In a selection phase 132 a design of the foam ceramic filter is then selected. In a printing phase 134, the selected foam ceramic filter is printed using an additive manufacturing machine. The additive manufacturing process in a withdrawal phase draws ceramic powders and additive binders from a material supply 136. In a sintering phase 138 the ceramic filter is sintered at a temperature above a temperature required for filtering the molten metal such as molten aluminum after printing the ceramic filter. In an assembly phase 140 the ceramic filter is assembled with multiple materials and layers, for example into the canister 22 described in reference to FIG. 1.

A ceramic foam filter of the present disclosure may consist of a controllable porous channel geometry and sizes in the filter. Variable cross-section sizes of the porous channels may be selected. An equivalent circle diameter (ECD) of a cross section of the porous channels may vary from 0.1 to 5 mm. A ceramic filter of the present disclosure may be formed of an array of channels with walls formed in a sinusoidal wave pattern that translates along a center of the channel. A flow channel or shaft inside of the channel conformally follows an inside of the channel wall such that a consistent gap is formed between the shaft and the channel. Channel and shafts may be configured with the same sinusoidal configuration interstitially located between four other channels but are translated in a 90-degree sinusoidal phase along the long axis of the shaft.

Channels may also be formed in a pattern that forces debris to collide with walls during flow such that a momentum of flowing particles is removed from high inertia debris yet allows less dense material with lower inertia to pass through the channels with less energy loss. The shaft may be supported by blades between the shaft and the walls to keep it located. A multiple-layer structure may be provided with different pore geometry and sizes at each layer. Multiple materials with different characteristics of wettability may also be printed in the same filter for specific melt treatment. Layers of filters may also be printed separately and combined for tuning a process to achieve optimal performance.

Printed and non-printed materials can be layered together to utilize performance characteristics of each substrate type. The filter may be printed to have unique geometries to assist with filter life, for example to be used in a melt furnace. Large debris can be guided to one area of the filter to keep the remainder of the filter clear. This can take advantage of micro or macro features.

A ceramic foam filter of the present disclosure offers several advantages. These include a ceramic filter having a cell/passage geometry that includes variable pore cross section sizes with a spiral shape or a sinusoidal wave pattern. The ceramic filter may have unique features to discharge the large debris from the upstream filter face when the ceramic filter is used in melting furnaces. The ceramic filter may include variable porous channel cross-sections, spiral porous channels and/or sinusoidal wave pattern channels. The ceramic filter provides a multi-layer structure with different pore sizes at each layer, and multi-material with different wettability.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to manufacture a ceramic foam filter, comprising:
    sintering a filter body to a temperature greater than a molten metal to be filtered through the filter body;
    creating multiple filter body tortuous path channels extending through the filter body individually having a repeated and controlled passage geometry creating a continuously changing diameter and area of a flow path through the multiple filter body tortuous path channels causing localized increases and decreases in molten metal flow rate through the multiple filter body tortuous path channels;
    creating a flow passage for individual ones of the multiple filter body tortuous path channels by adding an impact wall between opposed first and second path channel walls oriented at an angle to a flow direction of the molten metal within the flow passage, wherein the impact wall includes multiple impact wall tortuous path channels configured to permit flow of the molten metal through the impact wall; and
    applying a mixture of at least one ceramic powder and at least one binder using additive manufacturing to shape the filter body including the multiple filter body tortuous path channels.

2. The method of claim 1, further including individually shaping the multiple filter body tortuous path channels as a sinusoidal-shape.

3. The method of claim 2, further including configuring the multiple filter body tortuous path channels having a first diameter at a largest section of an oval-shaped pocket which is larger than a second diameter at a reduced diameter neck region.

4. The method of claim 1, further including configuring the filter body having multiple layers, with individual ones of the multiple layers having different sizes of the multiple filter body tortuous path channels.

5. The method of claim 4, further including removing individual ones of the multiple layers to change a total flow rate through the filter body.

6. The method of claim 4, further including providing a different wettability for individual ones of the multiple layers.

7. The method of claim 1, further including creating recurring rectangular-shaped pockets including a reducing area neck region for individual ones of the multiple filter body tortuous path channels.

8. The method of claim 1, further including:
    forming an inner wall of a point cavity in the second path channel wall acting to trap objects entrained within the molten metal.

9. The method of claim 1, further including:
    positioning a V-shaped impact wall within a flow passage defined between opposed first and second path channel walls oriented at an angle to a flow direction of the molten metal within the flow passage; and
    creating an inverted V-shaped upstream wall of the V-shaped impact wall.

10. The method of claim 1, further including conducting the sintering to a temperature greater than a temperature of a molten aluminum defining the molten metal.

11. A method to manufacture a ceramic foam filter, comprising:
    applying a mixture of at least one ceramic powder and at least one binder using additive manufacturing to shape a filter body;
    extending multiple filter body tortuous path channels through the filter body including at least a first cross section having a first area and a second cross section having a second area less than the first area;
    creating a flow passage for individual ones of the multiple filter body tortuous path channels having an impact wall positioned between opposed first and second path channel walls oriented at an angle to a flow direction of molten metal within the flow passage, wherein the impact wall includes multiple impact wall tortuous path channels configured to permit flow of the molten metal through the impact wall;
    varying an equivalent circle diameter of the multiple filter body tortuous path channels between 0.1 mm and 5.0 mm; and
    sintering the filter body to a temperature greater than a molten metal to be filtered through the filter body.

12. The method of claim 11, further including forming the filter body using multiple layers.

13. The method of claim 12, further including selecting a different flow of the molten metal through the multiple filter body tortuous path channels by varying the multiple filter body tortuous path channels in different ones of the multiple layers.

14. The method of claim 11, further including creating a continuously changing diameter and area of a flow path through the multiple filter body tortuous path channels.

15. The method of claim 11, further including shaping the multiple filter body tortuous path channels as spiral-shaped channels.

16. The method of claim 11, further including creating the filter body using multiple layers with the multiple filter body tortuous path channels of individual ones of the multiple layers having different flow passage sizes.

17. The method of claim 11, further including:
    forming an inner wall of a point cavity in the second path channel wall to trap objects entrained within the molten metal.

18. A method for making a ceramic foam filter, comprising:
    selecting a ceramic foam filter body having a cell geometry of the ceramic foam filter body including one of a plurality of multiple filter body tortuous path channels extending through the ceramic foam filter body wherein the multiple filter body tortuous path channels have a repeated and controlled passage geometry;

creating a flow passage for individual ones of the multiple filter body tortuous path channels by adding an impact wall between opposed first and second path channel walls oriented at an angle to a flow direction of molten metal within the flow passage, wherein the impact wall includes multiple impact wall tortuous paths configured to permit flow of the molten metal through the impact wall;

combining ceramic powders and at least one binder in a combining operation;

printing the ceramic foam filter body using the ceramic powders and the binder using an additive manufacturing operation; and sintering the ceramic foam filter body at a temperature greater than a molten metal to be filtered by the ceramic foam filter body.

19. The method of claim 18, further including selecting a continuously changing diameter and area of a flow path through individual ones of the multiple filter body tortuous path channels.

20. The method of claim 18, further including selecting an equivalent circle diameter of a cross section of the multiple filter body tortuous path channels between 0.1 mm and 5.0 mm.

* * * * *